(12) United States Patent
Biebach

(10) Patent No.: US 11,831,195 B2
(45) Date of Patent: Nov. 28, 2023

(54) GENERATOR SET FOR GENERATING AN ALTERNATING CURRENT

(71) Applicant: Torqeedo GmbH, Gilching (DE)

(72) Inventor: Jens Biebach, Tutzing (DE)

(73) Assignee: Torqeedo GmbH, Gilching (DE)

( * ) Notice: Subject to any disclaimer, the term of this patent is extended or adjusted under 35 U.S.C. 154(b) by 335 days.

(21) Appl. No.: 17/075,293

(22) Filed: Oct. 20, 2020

(65) Prior Publication Data

US 2021/0119472 A1    Apr. 22, 2021

(30) Foreign Application Priority Data

Oct. 21, 2019   (DE) .................... 10 2019 128 387.6

(51) Int. Cl.
| | |
|---|---|
| H02J 7/14 | (2006.01) |
| H02J 3/38 | (2006.01) |
| H02J 9/06 | (2006.01) |
| H02P 9/04 | (2006.01) |
| H02P 9/10 | (2006.01) |
| H02K 7/20 | (2006.01) |
| H02K 7/18 | (2006.01) |
| H02K 7/116 | (2006.01) |

(52) U.S. Cl.
CPC ............ *H02J 7/1415* (2013.01); *H02J 9/062* (2013.01); *H02K 7/20* (2013.01); *H02P 9/04* (2013.01); *H02P 9/102* (2013.01); *H02K 7/116* (2013.01); *H02K 7/1815* (2013.01)

(58) Field of Classification Search
CPC .......... H02J 7/1415; H02J 9/062; H02K 7/20; H02K 7/116; H02K 7/1815; H02P 9/04; H02P 9/102

USPC .......................................................... 318/139
See application file for complete search history.

(56) References Cited

U.S. PATENT DOCUMENTS

| | | | | |
|---|---|---|---|---|
| 5,842,534 | A | * 12/1998 | Frank | ................. B60K 6/48 903/917 |
| 2009/0322084 | A1 | 12/2009 | Hamilton | |
| 2010/0270864 | A1* | 10/2010 | Vyas | .................... H02J 7/35 290/40 B |
| 2016/0359328 | A1 | 12/2016 | Hunt et al. | |

FOREIGN PATENT DOCUMENTS

| | | |
|---|---|---|
| DE | 10 2005 000 998 A1 | 7/2006 |
| DE | 11 2017 003 686 T5 | 4/2019 |
| EP | 2 251 953 A2 | 11/2010 |

(Continued)

OTHER PUBLICATIONS

EP 3016271 A2 "Power Plant"; Date Published: May 4, 2016; Inventor: Lu Hang (Year: 2016).*

(Continued)

*Primary Examiner* — Jorge L Carrasquillo
(74) *Attorney, Agent, or Firm* — Crowell & Moring LLP

(57) ABSTRACT

A generator set for generating an alternating current, includes a primary power unit, an alternating current generator, and a secondary power unit. The alternating current generator is rotationally coupled to the primary power unit, and converts power provided by the primary power unit into an electric power. The secondary power unit is connectable to the alternating current generator so as to increase the power generated by the alternating current generator.

11 Claims, 2 Drawing Sheets

(56) References Cited

FOREIGN PATENT DOCUMENTS

| EP | 2 317 640 A1 | 5/2011 | | |
|----|----|----|----|----|
| EP | 3 016 271 A2 | 5/2016 | | |
| EP | 3 351 472 A2 | 7/2018 | | |
| EP | 3351472 A2 | * | 7/2018 | .......... B60L 15/2045 |
| WO | WO 93/14561 A1 | 7/1993 | | |
| WO | WO-02058209 A1 | * | 7/2002 | .............. B60K 6/46 |
| WO | WO 2019/077554 A1 | 4/2019 | | |

OTHER PUBLICATIONS

WO 9314561 A1 "Apparatus for Electrical Speed Control of a Water Turbine in a Small Hydroelectric Power Plant"; Date Published: Jul. 22, 1993 Inventor Information Name: Ledr Zdenek (Year: 1993).*
German-language Extended European Search Report dated Feb. 23, 2021, with Statement of Relevancy (Ten (10) pages).
German Search Report issued in German application No. 10 2019 128 387.6 dated May 15, 2020, with Statement of Relevancy (Eight (8) pages).

* cited by examiner

GENERATOR SET FOR GENERATING AN ALTERNATING CURRENT

CROSS REFERENCE TO RELATED APPLICATIONS

This application claims priority under 35 U.S.C. § 119 from German Patent Application No. 10 2019 128 387.6, filed Oct. 21, 2019, the entire disclosure of which is herein expressly incorporated by reference.

BACKGROUND OF THE INVENTION

The present invention relates to a generator set for generating an alternating current.

Conventional generator sets are generally made up of an internal combustion engine and a generator, the internal combustion engine being coupled via a gearbox or directly to the electrical generator, usually a separately-excited synchronous machine.

Here, the requirements for the alternating current mains frequency are determined by standards which also define, for example, the permissible frequency deviation. In an alternating current system with a plurality of sources, the frequency controls the power distribution. The higher the frequency, the higher the pro rata power contribution.

The aim is often to keep the relative power contribution of a generator as constant as possible at different operating points. To ensure that the frequency does not leave the permissible tolerance band even when exposed to a power surge, the internal combustion engine must have control reserves and a fast control system. The mass inertia of the generator set also helps to keep the frequency constant during a sudden load variation.

Internal combustion engines frequently lack the necessary control dynamics with the result that, even if there is a control reserve, larger engines are used so that the required mass inertia can be provided. This leads to the use of internal combustion engines whose nominal power is significantly higher than the nominal power of the generator. In many cases, this means that the exhaust gas temperature required for proper after-treatment of exhaust gases is not reached. Maintenance costs increases as a result. In addition, more complex and/or additional exhaust gas treatment have to be provided. This leads to high costs for the internal combustion engine and exhaust gas system.

SUMMARY OF THE INVENTION

It is an object of the present invention to provide an improved generator set for generating an alternating current.

Accordingly, a generator set for generating an alternating current is proposed, comprising a primary power unit and an alternating current generator rotationally coupled to said primary power unit, said alternating current generator being configured to convert a primary power provided by the primary power unit into an electric power. The generator set is further characterized by a connectable secondary power unit, which is designed in such a manner that the power generated by the alternating current generator is increased by connecting said secondary power unit.

By providing a connectable secondary power unit, which is designed in such a manner that the power generated by the alternating current generator is increased by connecting said secondary power unit, it is possible to temporarily cover an additional power requirement which exceeds the power available via the nominal power of the internal combustion engine, without having to provide power reserves in the internal combustion engine that would perhaps result in an internal combustion engine with a nominal power that would be significantly above the nominal power of the generator. In fact, the connectable secondary power unit facilitates an almost optimum design of internal combustion engine and alternating current generator in relation to each other for continuous operation, particularly when operating the alternating current generator at its nominal power.

Consequently, in intended continuous operation of the primary power unit, it can be operated close to or even at its nominal power. As a result, it is possible to reach an exhaust gas temperature which is required for the best possible exhaust after-treatment provided for this primary power unit. This keeps the maintenance costs of the primary power unit low. In addition, the exhaust after-treatment can be simply constructed and/or it is possible to dispense with an additional and/or complex exhaust after-treatment unit that would otherwise have to be provided.

The secondary power unit is preferably designed to be connectable at least temporarily.

In at least one embodiment, the power of the alternating current generator corresponds to a power generated via a primary nominal power input supplied to the alternating current generator by the primary power unit. This makes it possible to operate the primary power unit close to its optimum operating point.

Tests have shown that it is particularly advantageous if the primary power unit is an internal combustion engine. Advantageously, the alternating current generator can be a separately-excited synchronous machine.

In at least one embodiment, the secondary power unit has an electric motor, preferably an asynchronous machine or a reluctance motor or switched reluctance motor (SRM), and a secondary energy store, preferably a battery, in particular a lithium-ion battery, or a capacitor, in particular an electrolytic capacitor or a supercapacitor, in electrical contact with the electric motor, the electric motor being preferably rotationally coupled to an input shaft of the alternating current generator. The electric motor makes it possible to provide additional mechanical power, in particular additional torque, at the alternating current generator in addition to the power provided via the primary power unit. It has been found that an electric motor, in particular if it is designed as an asynchronous machine or as a reluctance motor, has particularly good overload capability and very good control dynamics. In addition, an electric motor, in particular designed as an asynchronous machine or reluctance motor, has low losses during standby operation which are generally negligible. The electric motor can also be designed in the form of a permanently-excited synchronous machine if it is possible to accept the iron losses which occur permanently.

The electrical contact between the electric motor and the secondary energy store comprises, if necessary, a converter, preferably a frequency converter, the converter acting as an adapter between the secondary energy store and the electric motor, in such a manner that the energy provided by the secondary energy store is converted or transformed, respectively, into a form suitable for operating the electric motor in its respective design.

In at least one embodiment, an output shaft of the primary power unit is directly rotationally connected to an input shaft of the alternating current generator. Alternatively, the output shaft of the primary power unit can be rotationally connected to the input shaft of the alternating current generator via a gearbox.

In at least one embodiment, an output shaft of the secondary power unit is directly rotationally connected to an input shaft of the alternating current generator. Alternatively, the output shaft of the secondary power unit can be rotationally connected to the input shaft of the alternating current generator via a gearbox.

Preferably, the secondary power unit can be decoupled from the alternating current generator and/or the secondary power unit can be designed to be connectable torque-free.

The secondary power unit can preferably be designed in such a manner that an electric motor of the secondary power unit is designed in such a manner that it can be operated as a generator. This allows an energy store of the secondary power unit to be charged by generator operation of the electric motor of the secondary power unit. For this, the torque required for generator operation can also be provided by the primary power unit and transferred via the alternating current generator or via a continuous input shaft of the alternating current generator.

Moreover, the converter of the electrical contact can be designed such that the energy formed by the electric motor in generator operation can be converted into a form which is suitable for charging the secondary energy store of the secondary power unit. In other words, the converter or inverter can be designed to work bidirectionally. Alternatively, a further converter can also be provided in the electrical contact, and/or a further converter, preferably a rectifier, is provided separately to the electrical contact.

The electric motor of the secondary power unit can be designed to be connectable torque-free. As long as the primary power unit is able itself to cover the power requirement called up from the generator set, by a consumer for example, the electric motor of the secondary power unit can be connected torque-free.

In particular, taking into consideration a target torque addition of a torque provided by the primary power unit and of a torque provided by the secondary power unit, it has proven advantageous, with respect to the alternating current generator, to arrange the primary power unit on a first side of the alternating current generator and the secondary power unit on a second side of the alternating current generator opposite the first side.

The primary power unit and the secondary power unit can also be arranged together on one side of the alternating current generator if the output shafts of the primary power unit and the secondary power unit permit torque addition.

In at least one embodiment, the primary power unit has a speed controller and/or the secondary power unit has a speed controller.

To achieve easy decentralized control/regulation of the secondary power unit, the activity of the secondary power unit can additionally be defined by a tolerance band of its own. Accordingly, the activity of the primary power unit can also be defined by a tolerance band of its own.

In at least one embodiment, the speed controller of the secondary power unit is fed a setpoint, thus a set speed, which is below, preferably slightly below, the setpoint or the set speed of the primary power unit. The setpoint of the secondary power unit is preferably within the tolerance band specified for the secondary power unit.

The control structure of the primary power unit and/or the secondary power unit is preferably constructed in two stages, an inner torque controller preferably being subordinate to an outer speed controller. In this case, the speed controller can supply the default values for the torque controller, the default values preferably being limited to positive torque values. As a result, it is possible to ensure that the secondary power unit normally cannot work against the speed controller of the primary power unit.

In at least one embodiment, different speed threshold values are specified for the primary power unit and the secondary power unit. This creates a hysteresis effect for the primary power unit and the secondary power unit which can reduce or even completely eliminate the occurrence of speed vibrations at the set speed which might occur due to connecting and/or disconnecting the torque provided via the secondary power unit.

It has been found that additional safety can be achieved with the optional use of a pure P-amplifier. By providing the P-amplifier, it is possible to ensure that the set torque increases with the control deviation, i.e. the closer the speed comes to the setpoint of the secondary power unit, the lower the torque.

In at least one embodiment, the primary power unit comprises a speed controller with connectable and disconnectable negative torque and/or the secondary power unit comprises a speed controller with connectable and disconnectable negative torque. It is preferably provided to control/regulate connection or disconnection of the negative torque according to the energy content of the energy store of the secondary power unit.

Particularly in the case that the energy store of the secondary power unit has a small capacity, such that the voltage when using the secondary machine or secondary power unit changes significantly, this voltage can be used as a criterion for activating or deactivating a negative torque. A negative torque is preferably enabled if the voltage of the energy store falls below a first limit value defined for this purpose. In addition, enabling of the negative torque can be withdrawn again if a further limit value, which is greater than the first limit value, is exceeded. This makes it possible to provide a hysteresis which enables stability regarding the charging function of the energy store.

In at least one embodiment, the control/regulation of connecting or disconnecting the negative torque can also be based on a different variable, preferably a charge of the energy store. This can be particularly advantageous if the capacity of the energy store is so large that the voltage shows no significant change during power output. To use the charge as a controlling/regulating variable, the stored current can be integrated over time. Similarly to control/regulation using the voltage of the energy store, the negative torque can also be enabled or connected when the charge of the energy store is used as a command variable/control variable if the charge falls below a specified value, such as an integral value of the stored current, and can be disconnected again if a further specified value, which is higher than the previously mentioned first specified value, is exceeded.

A further controller can be provided for controlling/regulating the voltage amplitude. When using a separately-excited synchronous generator, this can optionally be done by tracking the excitation.

In at least one embodiment, the secondary power unit, preferably an electric motor of the secondary power unit, is designed in such a manner that its torque, preferably its nominal torque, is greater than a breakaway torque of the primary power unit, preferably greater than the breakaway torque plus the mechanical losses which are present in the prescribed system. In other words, the secondary power unit can be designed to provide a torque which is greater than the breakaway torque and the mechanical losses of the generator set. This may make it possible to start the generator set via the secondary power unit or at least to support starting the generator set using a starter.

In at least one embodiment, the secondary power unit comprises a secondary energy store, preferably a battery, in particular a lithium-ion battery, or a capacitor, in particular an electrolytic capacitor or a supercapacitor, and an inverter, preferably an externally-commutated inverter. An output line of the alternating current generator and an output line of the inverter, preferably designed to be connectable and disconnectable, are preferably connected to each other. In this way, additional power can be delivered to the generated power of the alternating current generator by connecting the secondary power unit directly from the energy store via the inverter. As a result, the primary power unit can be unloaded and continue to operate at its design point.

In at least one embodiment, the inverter of the secondary power unit is a bidirectional inverter. Thus, in normal operation, energy for (re)charging the secondary energy store can be provided by the alternating current generator and can be fed to the secondary energy store via the bidirectional inverter. Alternatively, an additional rectifier can also be provided, via which the secondary energy store can be charged using the alternating current generated by the alternating current generator.

In at least one embodiment, it can be provided that the secondary energy store can be charged by connecting it to a power supply system. The secondary energy store preferably has an appropriate connection unit for this purpose.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
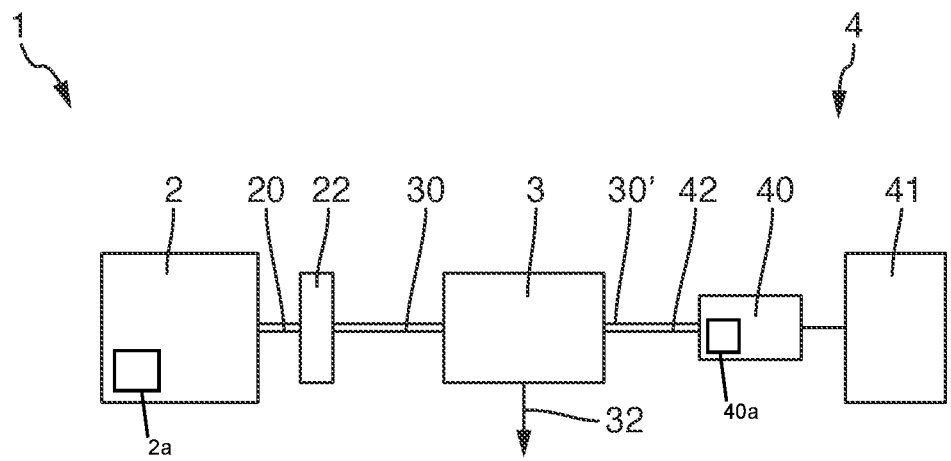
FIG. 1 schematically a diagram of a generator set for generating an alternating current according to aspects of at least one embodiment.

The figures illustrate aspects of the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail. Identical, similar or equivalent elements are also provided with the same reference numbers in the different figures and repeated description of these elements is partly omitted to avoid redundancies.

FIG. 1 schematically shows a diagram of a generator set 1 for generating an alternating current according to at least one embodiment. The generator set 1 comprises a primary power unit 2 in the form of an internal combustion engine, in the present case a diesel engine, and an alternating current generator 3 rotationally coupled to the primary power unit 2, in the present case in the form of a separately-excited synchronous machine, which is configured to convert a primary power provided by the primary power unit 2 into an electric power. The generator set 1 also has a connectable secondary power unit 4 which is designed such that the power generated by the alternating current generator 3 can be temporarily increased by connecting said secondary power unit 4.

Here, the power of the alternating current generator corresponds to a power generated via a primary nominal power input supplied to the alternating current generator by the primary power unit.

The secondary power unit 4 has an electric motor 40, in the present case an asynchronous machine, and a secondary energy store 41 in electrical contact with the electric motor 40, for example in the form of a battery, in particular a lithium-ion battery, or in the form of a capacitor, optionally an electrolytic capacitor or a supercapacitor. The electrical contact between electric motor 40 and secondary energy store 41 comprises a bidirectional inverter (not shown) which converts the energy provided by the secondary energy store 41 into the form suitable for operating the electric motor 40 and vice versa.

The electric motor 40 is rotationally coupled to an input shaft 30' of the alternating current generator 3. The electric motor 40 makes it possible to provide additional mechanical power, in particular additional torque, at the alternating current generator 3 in addition to the power provided via the primary power unit 2.

Alternatively, the electric motor 40 can also be designed as a reluctance motor or switched reluctance motor (SRM). In addition, the output shaft 42 of the secondary power unit 4 can be rotationally connected to the input shaft 30' of the alternating current generator 3 via a gearbox (not shown).

An output shaft 20 of the primary power unit 2 is rotationally connected to an input shaft 30 of the alternating current generator 3 via a gearbox 22. Alternatively, the output shaft 20 can also be directly rotationally coupled to the input shaft 30.

The electric motor 40 is designed to be decoupled from the alternating current generator 3. In addition, the electric motor 40 can also be operated as a generator in order to charge the secondary energy store 41 if the secondary power unit 4 does not need to provide any additional power.

As long as the primary power unit 2 is able itself to cover the power requirement called up from the generator set 1, by a consumer for example, and the secondary energy store 41 does not have to be charged, the electric motor 40 of the secondary power unit 4 can be connected torque-free.

In the present case, with respect to the alternating current generator 3, the primary power unit 2 is arranged on a first side of the alternating current generator 3 and the secondary power unit 4 is arranged on a second side of the alternating current generator 3 opposite the first side.

Alternatively, the primary power unit 2 and the secondary power unit 4 can also be arranged together on one side of the alternating current generator 3.

In the present case, the primary power unit 2 and the secondary power unit 4 each have a speed controller 2a, 40a. In addition, the primary power unit 2 and secondary power unit 4 are each assigned a tolerance band of their own.

The speed controller 40a of the secondary power unit 4 is supplied with a setpoint in the form of a set speed, which is slightly below a setpoint in the form of a set speed of the primary power unit 2, but is within the tolerance band specified for the secondary power unit 4.

The primary power unit 2 and the secondary power unit 4 each have a two-stage control structure, an inner torque controller being subordinate in each case to an outer speed controller. In this way, the speed controller supplies the default values for the torque controller, the default values being optionally limited to positive torque values according to this preferred embodiment.

In addition, different speed threshold values are specified for the primary power unit 2 and the secondary power unit 4. This provides a hysteresis effect for the primary power unit 2 and the secondary power unit 4 which reduces or even completely eliminates the occurrence of speed vibrations at the set speed which might occur due to connecting and/or disconnecting the torque provided via the secondary power unit 4.

A pure P-amplifier may be used to provide additional safety.

The speed controller 40a of the secondary power unit 4 is designed with connectable and disconnectable negative torque. In the present case, connecting or disconnecting the negative torque is controlled/regulated based on the energy content of the secondary energy store 41.

The electric motor 40 of the secondary power unit 4 is designed in such a manner that it can provide a torque which is greater than a cumulative torque formed from the breakaway torque of the primary power unit 2 and the mechanical losses of the generator set 1. This allows the generator set 1 to be started via the secondary power unit 4.

Figure 2:
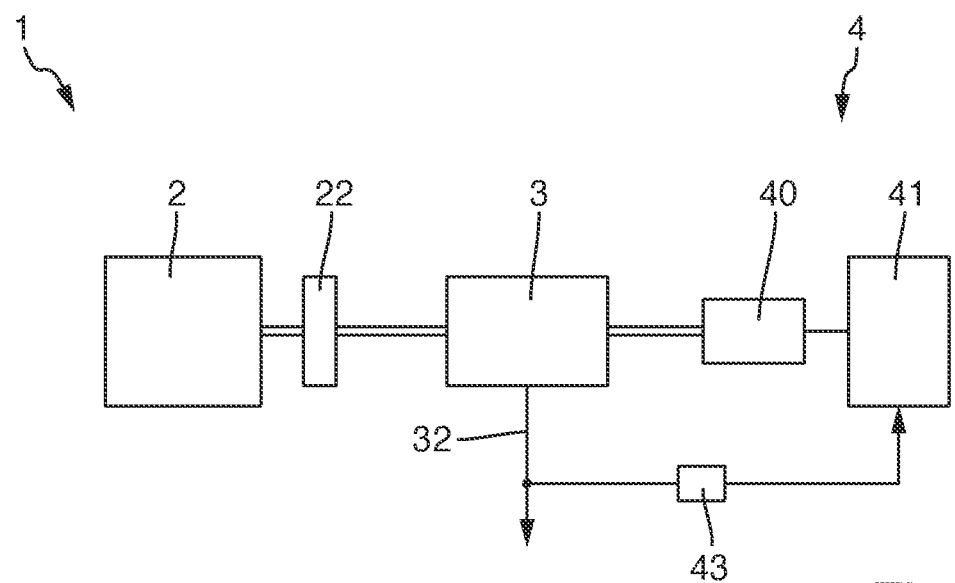
FIG. 2 schematically a diagram of a generator set for generating an alternating current according to aspects of at least one embodiment.

FIG. 2 shows a diagram of a generator set 1 for generating an alternating current according to at least one embodiment. The generator set 1 from FIG. 2 corresponds substantially to the generator set from FIG. 1, wherein a rectifier 43 additionally is provided via which the secondary energy store 41 can be disconnectably connected to the output line 32 of the alternating current generator 3. In this way, the secondary energy store 41 can be charged by converting the alternating voltage provided by the alternating current generator 3 into a direct voltage via the rectifier 43.

Figure 3:
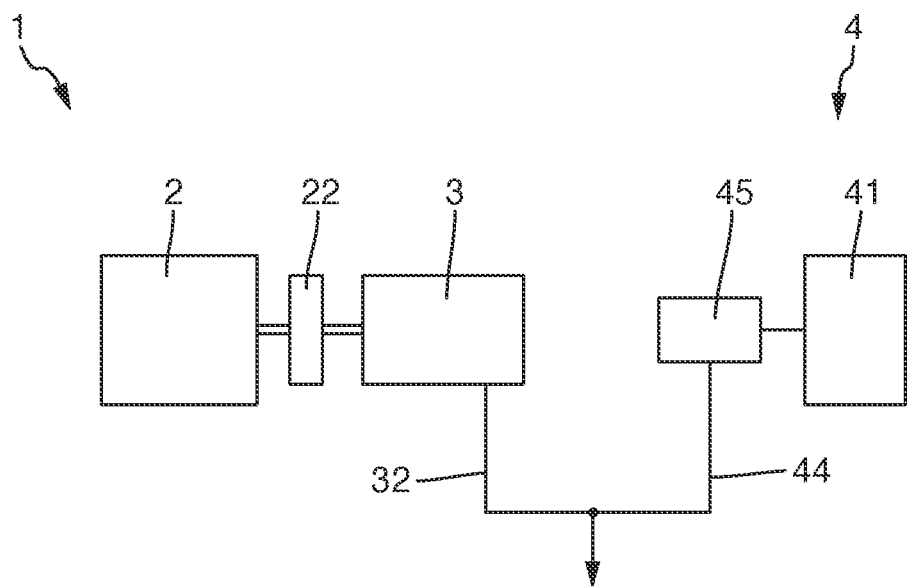
FIG. 3 schematically a diagram of a generator set for generating an alternating current according to aspects of at least one embodiment.

FIG. 3 shows a diagram of a generator set 1 for generating an alternating current according to at least one embodiment. Similar to the aspects of FIGS. 1 and 2, the generator set 1 has a primary power unit 2 in the form of an internal combustion engine which is connected to an alternating current generator 3 by way of a gearbox 22.

Alternative to the aspects of FIGS. 1 and 2, in FIG. 3 the secondary power unit 4 has a secondary energy store 41, for example a battery, such as a lithium-ion battery, or a capacitor, for example an electrolytic capacitor or a supercapacitor, and in addition an inverter 45, optionally in the form of an externally-commutated inverter 45.

An output line 44 of the inverter 45 is connectably and disconnectably connected to the output line 32 of the alternating current generator 3. To provide additional power on the output line 32, the output line 44 can be connected to the output line 32. Additional power from the secondary energy store 41 is thus provided via the inverter 45.

Optionally, the inverter 45 can be designed as a bidirectional inverter or converter such that in normal operation the secondary energy store 41 can be charged via the power provided on the output line 32 by the alternating current generator 3. Alternatively, similarly to the embodiment in FIG. 2, a separate rectifier (not shown in FIG. 3) can be provided to charge the secondary energy store 41.

Where applicable, all the individual features illustrated in the embodiments can be combined and/or replaced with each other without departing from the scope of the invention.

LIST OF REFERENCE NUMBERS

1 Generator set
2 Primary power unit
20 Output shaft
22 Gearbox
3 Alternating current generator
30, 30' Input shaft
32 Output line
4 Secondary power unit
40 Electric motor
41 Secondary energy store
42 Output shaft
43 Rectifier
44 Output line
45 Inverter

The invention claimed is:

1. A generator set for generating an alternating current, comprising:
a primary power unit having a first speed controller supplied with a first setpoint speed;
an alternating current generator rotationally coupled to the primary power unit, wherein the alternating current generator is configured to convert a primary power provided by the primary power unit into an electric power; and
a secondary power unit, including:
a second speed controller supplied with a second setpoint speed below the first setpoint speed and within a tolerance band of the secondary power unit,
an electric motor rotationally coupled to an input shaft of the alternating current generator, and
a secondary energy store in electrical contact with the electric motor,
wherein the secondary power unit is connectable to the alternating current generator so as to increase the power generated by the alternating current generator.

2. The generator set of claim 1, wherein the power of the alternating current generator corresponds to a power generated via a primary nominal power input supplied to the alternating current generator by the primary power unit.

3. The generator set of claim 2, wherein the secondary power unit includes an externally-commutated inverter.

4. The generator set of claim 1, wherein the primary power unit is an internal combustion engine, and/or that the alternating current generator is a separately-excited synchronous machine.

5. The generator set of claim 1, wherein an output shaft of the primary power unit is rotationally connected, directly or via a gearbox, to an input shaft of the alternating current generator.

6. The generator set of claim 1, wherein an output shaft of the secondary power unit is rotationally connected, via a gearbox, to an input shaft of the alternating current generator.

7. The generator set of claim 1, wherein a control structure of the primary power unit and/or a control structure of the secondary power unit is two staged, such that an inner torque controller is subordinate to an outer speed controller, the speed controller supplies the default values for the torque controller, and the default values are limited to positive torque values.

8. The generator set of claim 1, wherein different speed threshold values are specified for the primary power unit and the secondary power unit.

9. The generator set of claim 1, wherein at least one of: the primary power unit and the secondary power unit, includes a speed controller with connectable and disconnectable negative torque, wherein connecting or disconnecting the negative torque is controlled according to the energy content of the secondary energy store of the secondary power unit.

10. The generator set of claim 1, wherein the secondary power unit is configured to provide a torque that is greater than a breakaway torque of the primary power unit and the mechanical losses of the generator set.

11. The generator set of claim 1, wherein the secondary power unit includes an externally-commutated inverter.

* * * * *